Figure 1:
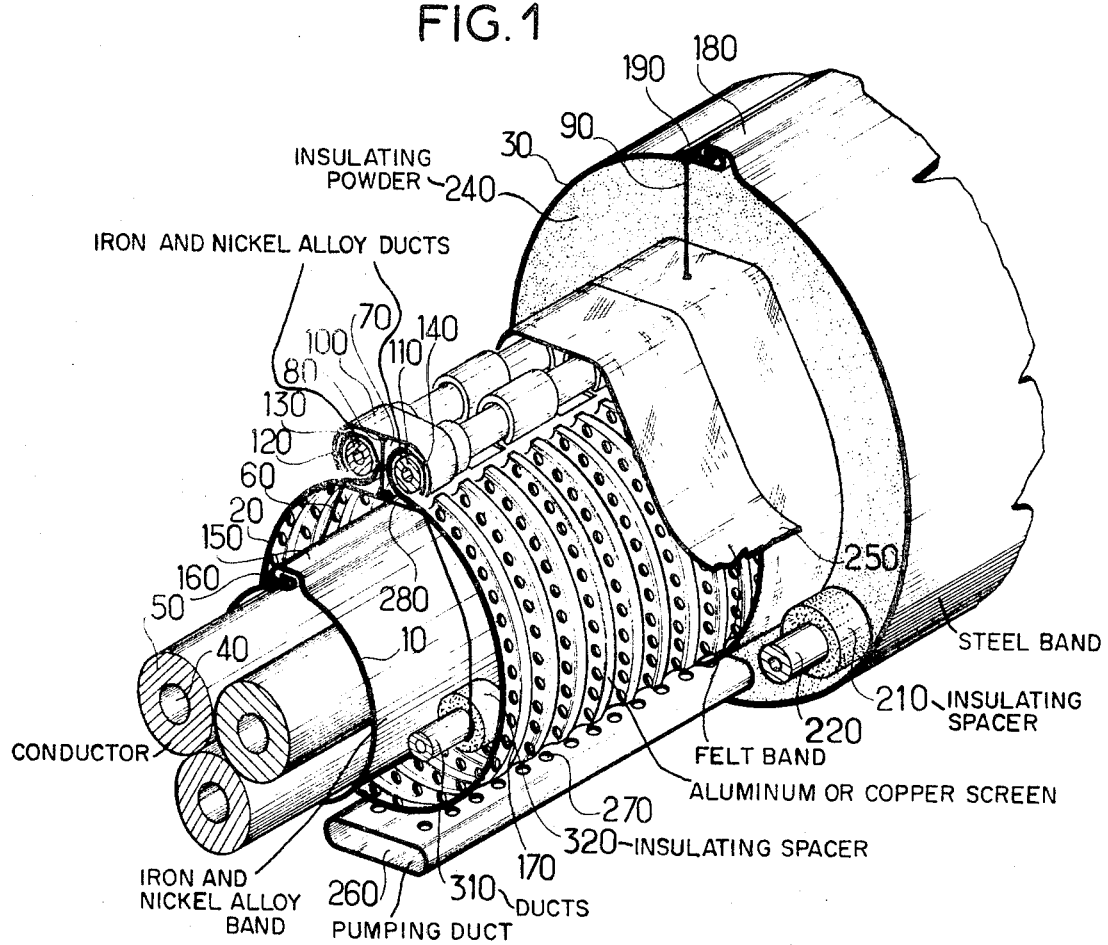

United States Patent [19]
Aupoix et al.

[11] 3,726,985
[45] Apr. 10, 1973

[54] CRYOGENIC CABLE CONSTRUCTION
[75] Inventors: Marcel Aupoix, Paris; François Moisson-Franckhauser, Bretigny-sur-Orge, both of France
[73] Assignees: Compagnie Generale D'Electricite-; L'Etude et L'Exploitation des Procedes Georges Claude, Paris, France
[22] Filed: Mar. 6, 1972
[21] Appl. No.: 232,077

[30] Foreign Application Priority Data
Mar. 5, 1971 France....................7107609

[52] U.S. Cl...............174/15 C, 174/27, 174/37, 174/113 R, 174/DIG. 6, 335/216
[51] Int. Cl............................................H01v 11/00
[58] Field of Search.............174/DIG. 6, 15 R, 174/15 C, 37, 16, 28, 27, 113 R, 116; 335/216

[56] References Cited

UNITED STATES PATENTS

| 3,604,832 | 9/1971 | Kohler | 174/DIG. 6 |
| 3,541,221 | 11/1970 | Aupoix et al | 174/15 C X |
| 3,529,071 | 9/1970 | Kafka | 174/DIG. 6 |
| 3,431,347 | 3/1969 | Kafka et al | 174/15 C |

Primary Examiner—Bernard A. Gilheany
Assistant Examiner—A. T. Grimley
Attorney—Paul M. Craig, Jr. et al.

[57] ABSTRACT

A cryogenic cable having an invariable length as a function of the temperature. The cable comprises in particular an inner enclosure which contains electric conductors and which is made of an iron and nickel alloy having a small thermal expansion coefficient, a thermal screen equipped with radial corrugations and cooling conduits or ducts formed integral therewith. These conduits are also made of an iron and nickel alloy having a small thermal expansion coefficient. The corrugations of the screen allow for absorbing the longitudinal stresses. Barriers for ensuring fluid-tightness are disposed at each end of the cable between the inner and the outer enclosures.

8 Claims, 3 Drawing Figures

CRYOGENIC CABLE CONSTRUCTION

The present invention relates to a cryojunction or cryoconnection of great length having a cylindrical shape.

It is known in the art to make cryogenic cables having a cylindrical shape and comprising generally an internal enclosure which contains the electrical conductors and in which a cryogenic fluid circulates. Disposed around this inner enclosure is a thermal screen, and an external enclosure surrounds both the inner enclosure and the thermal screen. The thermal screen is also generally equipped with cooling means. For such cryogenic cables, the enclosures consist generally of ordinary metals, for example steel for the external enclosure and stainless steel for the internal enclosure, and the screen is generally made of either copper or aluminum. Suspension systems are provided in order to maintain in place the internal enclosure and the screen within the external enclosure.

By reason of the fact that the materials being employed have a significant thermal expansion coefficient in the case of cable sections having a great length, for which the aforementioned materials are used, it is necessary to mount at each section end a bellows or other expansion means which makes it possible to absorb the longitudinal thermal stresses of the section being considered. The suspension systems of the internal enclosure and of the screen in the external enclosure must furthermore permit relative movements of the enclosures and of the screen due to the thermal contraction occurring when the unit is exposed to cold temperatures.

Unit sections of known cables of great length (for example 400 meters) have moreover the drawback that they display a significant buckling effect and the presence of expansion joints at each section end makes the problems of compensating for the buckling rather difficult to solve.

The present invention provides a remedy for these drawbacks and is concerned with and directed to a cryogenic cable comprising an internal cylindrical enclosure which is metallic and fluid-tight, this enclosure carrying a cryogenic fluid and containing a plurality of electric conductors, a thermal screen surrounding the internal enclosure in spaced relationship, cooling ducts or conduits mounted integral with the screen, an external cylindrical enclosure which is metallic and fluid-tight enclosing the screen in spaced relationship, a system for suspending the internal enclosure and the screen within the external enclosure, at least one perforated line or duct designed to produce a vacuum between the inner and outer enclosures, a thermal insulator occupying the space comprised between the screen and the external enclosure, conduits or ducts for returning the cooling fluid of the screen disposed within this space, and conduits or ducts for returning the cooling fluid of the internal enclosure disposed between the internal enclosure and the screen. The invention is particularly characterized by the fact that the screen is equipped with radial corrugations for absorbing the longitudinal thermal expansion thereof, the aforementioned cooling conduits or ducts of the screen and the internal enclosure consisting of a material whose relative thermal contraction is smaller than $5 \times 10^{-4}$ and the screen consisting of at least one material whose relative thermal contraction is greater than $10^{-3}$.

Figure 2:
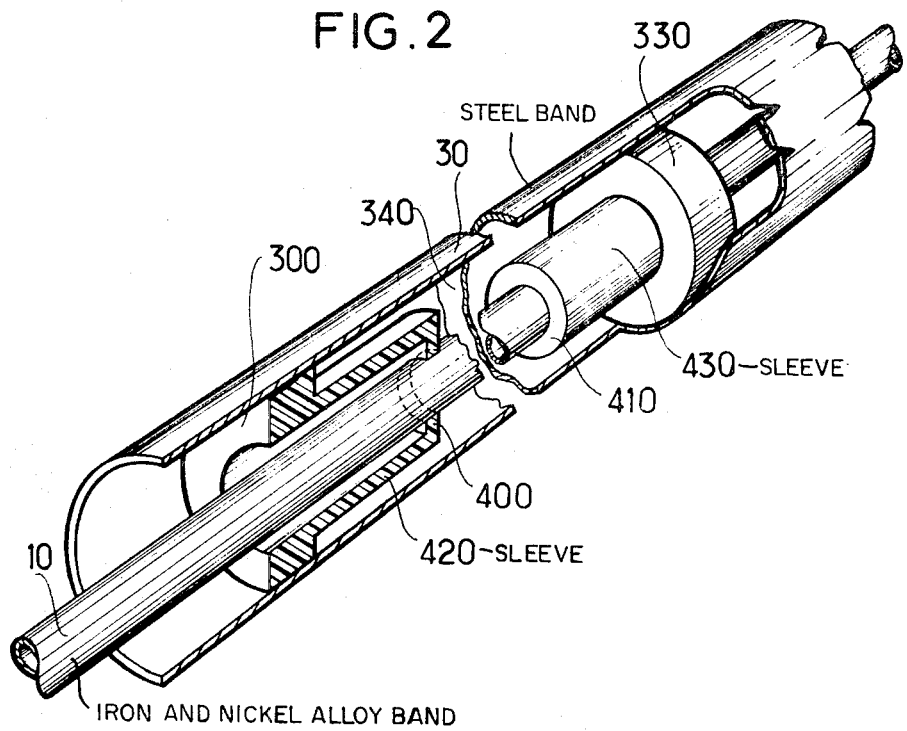
Figure 3:
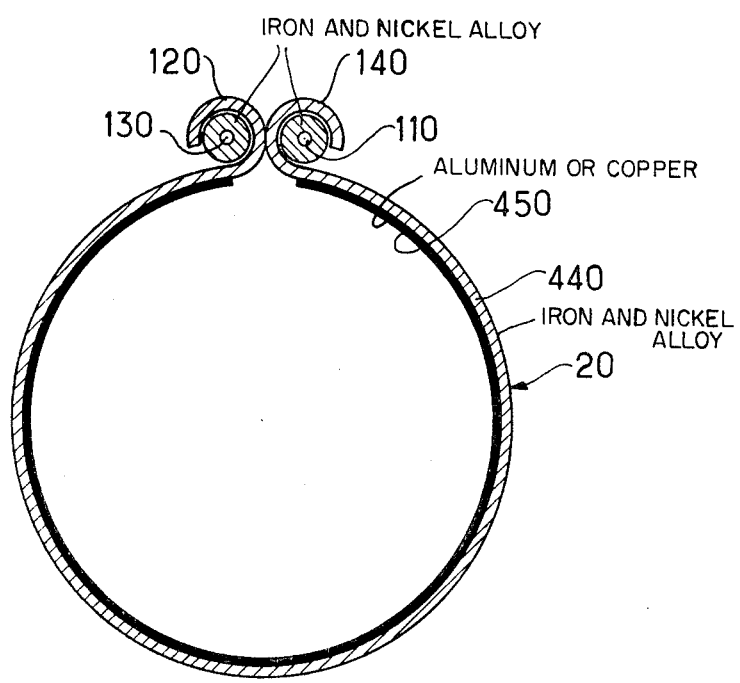

One embodiment of a cryogenic cable as proposed by the present invention will now be further described hereinafter purely by way of example which is not to be considered limiting, taken in connection with the accompanying schematic drawings, wherein FIG. 1 is a sectional view in perspective, arranged in layers, of a cryogenic cable constructed according to the present invention;

FIG. 2 is a longitudinal sectional view of the cryogenic cable with a system of fluid-tight partitioning at each end, and FIG. 3 is a cross-sectional view of the thermal screen according to a preferred embodiment of the present invention.

The cryolinkage according to FIG. 1 comprises an inner enclosure 10 consisting of a band or strip which has been bent along its longitudinal axis into cylindrical form and is made from an iron and nickel alloy having a small thermal expansion coefficient. This enclosure contains a plurality of electric conductors 50 whose number has been limited to three by way of example.

This iron and nickel alloy has a relative thermal contraction close to $4.2 \times 10^{-4}$. It contains from 30 to 45 percent nickel. It is, for example, an alloy marketed under the trade name of INVAR and is produced in France by the Societe Metallurgique d'IMPHY. It is quite obvious that any other alloy having a thermal contraction smaller than $5 \times 10^{-4}$ could also be employed for purposes of the present invention.

In the central bore 40 of the conductors 50, which have been schematically shown in the form of tubes, a cryogenic fluid may circulate. A cryogenic fluid may also circulate around these conductors in the inner enclosure 10, the fluid-tightness of which is assured by means of the connection of U-shaped edges forming the seam 150 provided in the band or strip which has been shaped to provide this cylindrical enclosure. The aforementioned seam is further soldered or welded to provide a seal 160 to assure the fluid-tightness of the enclosure.

The cryogenic cable of FIG. 1 further comprises a thermal screen 20 enclosing the unit made up of the inner enclosure 10 and the lines or ducts 310 disposed symmetrically on both sides at the outside of the inner enclosure. These lines or ducts allow for the return of the cryogenic fluid (helium, for example) which keeps the inner enclosure 10 and the conductors 50 cold. The aforementioned cylindrical thermal screen may be made from aluminum. It is a bent band equipped with radial corrugations and with perforations 170. The two edges of this bent band are turned and brazed outwardly at 120 and 140 so as to locate and maintain the cooling means of the screen, represented by conduits or ducts 110 and 130, for the circulation of a cryogenic fluid.

According to the present invention, these conduits or ducts are also made of an iron and nickel alloy of the type described for the inner enclosure 10. The inner enclosure 10 containing the conductors is held coaxially with respect to the screen by means of a suspension system represented by a wire 60 which is secured to a horizontal plate 280, which in turn is secured to a vertical plate 70 soldered or welded at 80 to a rider portion 100, provided to keep the portions opposite the turned-out edges 120 and 140 of the screen in an adjacent position.

This support system makes it possible to obtain a weak thermal contact under vacuum between the supports and the different elements of the cable and thus serves to reduce the thermal losses or leaks between the screen and the inner enclosure.

The corrugations in the screen make it possible to reduce the longitudinal thermal contractions. These corrugations which are associated with the conduits or ducts 110 and 130 having a low thermal expansion coefficient make it possible to obtain a screen of invariable length as a function of the thermal fluctuations.

In order to assure a better thermal contact between the screen 20 and the cooling conduits or ducts thereof, the turned-out edges of the aluminum strip or band constituting the screen 20 are punched or cut out as transverse slots in such a manner that these turned-out edges will come to constitute tongue portions which are then brazed onto the conduits or ducts 110 and 130.

The perforations of the screen 20 makes it possible to use pumps distributed along the cable in order to establish a vacuum between the inner and outer enclosures. The pumping line or duct 260 then has a very reduced pumping impedance. The vacuum which exists on both sides of the thermal screen and the multiplicity of perforations of this screen at the hollow of the corrugations provide for a reduction of the pumping impedance of the insulating powder 240 at the time of degassing thereof, and thus for shortening the duration of the first pumping when the cable is being laid.

Since, moreover, the inner portion of the cable has a low temperature and leaks may exist at the level of the outer enclosure 30, the construction which has been described hereinabove facilitates the pumping of these leaks toward the wall of the inner enclosure 10. Finally, the placing of the insulating powder 240 under a very pronounced vacuum by virtue of the pumping through the perforations of the thermal screen imparts to the powder the thermal insulation properties thereof.

The cryolinkage according to FIG. 1 further comprises an outer enclosure 30 having the shape of a cylinder and made of steel band longitudinally bent into a cylindrical shape. The fluid-tightness of the enclosure is assured by the clamp 180 and by the solder or welding joint 190 of this clamp. In the space comprised between the screen 20 and the outer enclosure 30, a pumping tube 260 is disposed which is provided with perforations 270.

A thermal insulator 240 (for example a powder) fills the space between the outer enclosure 30 and the screen 20. In order to avoid the penetration of this powder into the space comprised between the inner enclosure and the screen through the perforations 170 of this screen, a filtering felt band 250 is wound around the screen 20.

Conduits or ducts 220 designed to assure the return of the cryogenic fluid (nitrogen, for example), which has kept the thermal screen cold, are disposed in the space comprised between this screen and the outer enclosure.

Thermally insulating spacer means 210 are distributed in places over the length of the conduits or ducts 220 and prevent the conduits or ducts from becoming displaced accidentally in the space between the screen and the outer enclosure. The suspension wire 90 soldered at 190 to the outer enclosure assures the suspension of the screen in the outer enclosure. This suspension wire is integral with an analogous system to that used to support internal enclosure 10 but is separate from that system. The suspension system including plates 80, 70 and rider portion 100 is fully disclosed in copending application Ser. No. 232,163, filed Mar. 6, 1972. This support makes it possible to obtain a weak thermal contact under vacuum with the other parts of the cable, thereby reducing the thermal losses or leaks between the outer enclosure and the screen.

The conduits or ducts 220 are advantageously placed in the lower portion of the space comprised between the screen and the outer enclosure. The insulating spacer means 210 is kept cold by the conduits or ducts 220 and may constitute bearing supports between the thermal screen 20 and the outer enclosure 30. The thermal losses or leaks in the thermal screen produced by these supports are reduced since the major portion of the thermal flux in the insulating spacer means 210 is evacuated by the conduits or ducts 220 whose temperature is not much higher than that of the thermal screen.

The same is true for the conduits or ducts 310 which are advantageously placed between the inner enclosure 10 and the screen 20. Insulating spacer means 320 may constitute bearing supports between the thermal screen 20 and the inner enclosure 10. The thermal losses or leaks of the inner enclosure which are due to these supports are reduced since the major portion of the thermal flux in the insulating spacer means 320 is evacuated by the conduits or ducts 310 whose temperature is not much higher than that of the inner enclosure 10.

It should be noted that the use of an iron and nickel alloy having a small thermal expansion coefficient makes it possible to form the conductors integral with the inner enclosure. This has the advantage of preventing the gliding of the conductor in the enclosure thereof, for example on a sloping piece of ground. It is not necessary to dispose expansion joints at each end of the cable sections, and the construction of the connection between different sections is thus simplified. The reliability of the energy transporting line is accordingly increased.

The inner enclosure 10 is subjected to the pressure of the cryogenic fluid and the conductors 50 have an invariable length as a function of the temperature. The longitudinal stresses are small when the cable is exposed to the cold, and the anchoring systems at the ends of each section are thus simple to make. These very small stresses are not prejudicial to the mechanical behavior of rectilinear enclosures of several hundred meters in length.

The thermal screen is kept cold by means of liquid nitrogen, for example. The material of which this screen consists may have a relative thermal contraction greater than $10^{-3}$. The screen may thus be made from either aluminum or copper. The outer enclosure may consist of steel treated at the inside in order to reduce the degassing, and at the outside against corrosion.

The inner enclosure having a low thermal expansion coefficient does not undergo a relative longitudinal displacement with respect to the outer enclosure and the screen, and the suspension system of this enclosure is greatly simplified. The putting under traction of the inner enclosure may make it possible to avoid the buckling of this enclosure when it is exposed to the cold.

In the case of non-rectilinear courses or paths, coupling or connecting elements between rectilinear sections are made in the factory, while taking into account the anomolies of the terrain.

The cryogenic cable of the present invention is compartmented at the ends of each rectilinear section having several hundred meters length, as has been indicated in FIG. 2. The space 340 comprised between the inner enclosure 10 and the outer enclosure 30 is closed off at the end of each section of substantial length by means of collars or flanges 300, 330, 400, 410, welded or soldered to the inner and outer enclosures and separated by fluid-tight sleeves 420 and 430. This space is closed so as to be rendered fluid-tight. It is quite evident that fluid-tight passages are provided for at the level of these ends in order to assure the proper connection between successive sections. Rectilinear sections of several hundred meters length are thus obtained by using an alloy whose thermal contraction is limited. This thermal contraction may be eliminated by putting the enclosures under a longitudinal traction. The sleeves 420 and 430 transmit these tractive forces or stresses to the outer enclosure. The thickness of the sleeves is compatible with the limitation of the stresses being produced. The length of these sleeves is adapted to the limitation of the thermal flux by conduction at the level of the thermal screen and the inner enclosure.

This provision makes it possible to avoid the buckling of the inner enclosure, the latter being put under traction and being devoid of expansion joints along a rectilinear section. The proposed structure and the adoption for the inner enclosure of an alloy having a low thermal contraction allow for the deletion of the mechanical connections with the outer enclosure. This facilitates the realization of cryogenic cables in the form of rectilinear sections of several hundred meters length. These sections are assembled to each other with the aid of preformed curvilinear elements in accordance with the paths intended to be taken.

FIG. 3 illustrates a preferred embodiment of the thermal screen in a cross-section.

The thermal screen 20 consists of a first bent band 440 made of Invar plated to a second bent band 450 made of either aluminum or copper. The second bent band is located inside the cylinder formed by the screen and its width is smaller than that of the first band. Thus, the turned-out edges 120 and 140 of the thermal screen are made from Invar, which allows for a soldering or welding of these turned-out edges onto the conduits or ducts 110 and 130, designed for cooling this screen, and thus assure a good thermal contact between these different elements. The aluminum or copper band may be calamined with the Invar band. This inner band at the cylinder formed by the screen is of small thickness and does not appreciably alter the properties of invariability of the iron and nickel alloy. The thermal contact being assured between the two constituents of the screen, the temperature difference is small between the portion of the screen close to the cooling conduits or ducts thereof, and the opposite portion of this screen, which therefore reduces the losses or leaks due to thermal radiation.

It is understood that other materials could be employed in making the screen and the outer enclosure.

The essential characteristic of the present invention is the elimination of any relative longitudinal displacement of the conductors, enclosures, thermal screen and supports. The reliability is thus particularly increased.

The foregoing description are directed to superconductive cables or connections. It is understood that cryoresistant linkages or connections (for example, cables from refined aluminum cooled with liquid nitrogen) are inferred from the structure described herein upon deletion of the thermal screen without departing from the spirit and scope of the present invention.

What we claim is:

1. A cryogenic cable comprising an inner cylindrical metallic fluid-tight enclosure containing a plurality of electrical conductors and carrying a cryogenic fluid, a thermal screen mounted in spaced surrounding relationship to said inner enclosure, a plurality of cooling conduits mounted integrally with said thermal screen, an outer cylindrical metallic fluid-tight enclosure mounted in spaced surrounding relationship to said thermal screen, support means for suspending the combination of said inner enclosure and said thermal screen within said outer enclosure, at least one perforated duct mounted adjacent said thermal screen within said outer enclosure for producing a vacuum between the inner and outer enclosures, thermal insulating means disposed in the space between said screen and said outer enclosure, a plurality of return cooling conduits disposed in the space between said screen and said outer enclosure, and a plurality of additional return cooling conduits disposed in the space between said screen and said inner enclosure, said inner enclosure and said cooling conduits being made of a material whose relative thermal coefficient of expansion and contraction is less than $5 \times 10^{-4}$, said screen being made of at least one material whose relative thermal coefficient of expansion and contraction is greater than $10^{-3}$ and being provided with radial corrugations along its length.

2. A cryogenic cable as defined in claim 1, wherein said inner enclosure and said cooling conduits are made of an iron and nickel alloy made up of between 30 and 45 percent nickel.

3. A cryogenic cable as defined in claim 1, wherein said screen is formed of a first longitudinally bent band made of a material whose relative thermal coefficient of expansion and contraction is less than $5 \times 10^{-4}$ and a second band having a smaller width than said first band and being joined to the inside surface of said first band so that both bands are coaxial, said second band being made of said material whose relative thermal coefficient of expansion and contraction is greater than $10^{-3}$.

4. A cryogenic cable as defined in claim 1, wherein a barrier is provided between said inner and outer enclosures at periodic intervals, said barriers comprising a plurality of collars and a plurality of sleeves connected to said collars so as to render the intervening space between barriers fluid-tight.

5. A cryogenic cable as defined in claim 4, wherein said collars and said sleeves are disposed so as to eliminate the thermal contraction of the elements of the cable.

6. A cryogenic cable as defined in claim 5, including means for prestressing said screen longitudinally to absorb thermal stresses.

7. A cryogenic cable as defined in claim 4, wherein said screen is formed of a first longitudinally bent band made of a material whose relative thermal coefficient of expansion and contraction is less than $5 \times 10^{-4}$ and a second band having a smaller width than said first band and being joined to the inside surface of said first band so that both bands are coaxial, said second band being made of said material whose relative thermal coefficient of expansion and contraction is greater than $10^{-3}$.

8. A cryogenic cable as defined in claim 7, wherein said inner enclosure and said cooling conduits are made of an iron and nickel alloy made up of between 30 and 45 percent nickel.

* * * * *